United States Patent
Raley, Jr.

[15] 3,669,918
[45] June 13, 1972

[54] BITUMINOUS COMPOSITIONS CONTAINING HIGH MOLECULAR WEIGHT ETHYLENE/PROPYLENE COPOLYMER

[72] Inventor: Charles F. Raley, Jr., Midland, Mich.
[73] Assignee: The Dow Chemical Company, Midland, Mich.
[22] Filed: June 18, 1969
[21] Appl. No.: 834,543

[52] U.S. Cl. .....................................260/28.5, 260/28.5 A
[51] Int. Cl. .....................................C08f 45/52, C09d 3/60
[58] Field of Search .........................................260/28.5 AS

[56] References Cited

UNITED STATES PATENTS 3,070,557  12/1962  Gessler et al.....................260/28.5 A
3,093,601  6/1963  Gessler et al.....................260/28.5 A

FOREIGN PATENTS OR APPLICATIONS 1,368,242  6/1964  France

Primary Examiner—Morris Liebman
Assistant Examiner—Samuel L. Fox
Attorney—Griswold & Burdick, L. J. Dankert, R. G. Waterman and M. S. Jenkins

[57] ABSTRACT

Bituminous compositions having improved impact strength at both high and low temperatures comprise asphalt and an ethylene/propylene copolymer having a molecular weight from about 50,000 to about 100,000.

6 Claims, No Drawings

3,669,918

BITUMINOUS COMPOSITIONS CONTAINING HIGH MOLECULAR WEIGHT ETHYLENE/PROPYLENE COPOLYMER

BACKGROUND OF THE INVENTION

This invention relates to improved bituminous compositions and particularly to bituminous compositions useful as roofing materials, adhesive materials and the like.

Asphalt and other bituminous materials have been widely utilized in the construction of roads, in the production of roofing materials and like protective coatings, as adhesive materials and the like. Unfortunately, however, such materials tend to deteriorate under conditions of extreme temperature variations, constant exposure to physical stress and various weather agents.

In order to overcome these deficiencies in the properties of the bituminous materials, particularly asphalt, it has been a practice in the art to blend various rubbers, particularly the styrene-butadiene rubbers, with the asphalt. It is found, however, that the unsaturated styrene-butadiene rubbers become oxidized, especially when exposed to high temperatures, and as a result lose many of their desirable properties such as elasticity, impact strength and the like. It has also been a practice to incorporate various polyolefins into asphalt to improve elasticity and impact strength. Unfortunately the polyolefins stiffen the resulting compositions which often causes poor low temperature flexibility. Such compositions, particularly in moisture laden areas, become brittle and are subject to cracking and crumbling upon exposure to extremely low temperatures.

More recently the incorporation of low molecular weight ethylene/propylene copolymers into asphalt has been found to improve low temperature flexibility somewhat. In some instances, however, such low molecular weight ethylene/propylene copolymers actually lower the impact strength of the asphalt. Also, some low molecular copolymers tend to flow at temperatures as low as 100° F; and as a consequence, blends of asphalt and the low molecular weight copolymers do not retain their original shape or uniform composition.

In view of the aforementioned problems it would be highly desirable to provide a bituminous composition which has good physical properties at both high and low temperatures.

SUMMARY OF THE INVENTION

In accordance with the present invention bituminous compositions having improved flexibility and impact strength over a wide range of temperatures are provided by blending together from about 99 to about 50 weight percent of a bituminous material with from about 1 to about 50 weight percent of an ethylene/propylene copolymer having a molecular weight from about 50,000 to about 100,000.

The resulting bituminous compositions are particularly useful as roofing compositions, protective coatings, sound-deadening coatings, water-repellant coatings, adhesives and the like. In addition, these novel compositions can be blended with sand, gravel and the like to form excellent paving and construction materials.

DESCRIPTION OF THE PREFERRED EMBODIMENTS

By the term "bituminous materials" is meant the many petroleum and like mineral residues ranging from those derived from petroleum (asphaltic products) to those derived from coal tar. The asphaltic products include native asphalts, residual asphalts, blown petroleum asphalts precipitated by propane and the like. The tar products include pitch obtained as a residue by the removal of volatile oils from coal tar by distillation as well as combinations thereof with oil, gas tar, and water gas tar. These materials are provided in the form of semi-liquids to semi-solids. The same groups of substances are also commonly prepared with a harder consistency and also with a higher fusing point. The latter materials are used primarily as coating or adhesive compositions. These and other bituminous materials are useful in the present invention. Preferred bituminous materials are the various types of asphalts such as the naphthenic and aromatic types with the naphthenic types being especially preferred.

Ethylene/propylene copolymers suitable for the purposes of this invention advantageously contain from about 10 to about 70 weight percent of polymerized ethylene and from about 90 to about 30 weight percent of polymerized propylene, preferably from about 40 to about 50 and from about 60 to about 50 weight percent, respectively. However, copolymers containing less than 10 weight percent and more than 70 weight percent of ethylene are operable. It is understood, however, that small amounts, i.e., up to about 5 weight percent, of other comonomers such as butene-1, hexene-1, pentene-1 and other alpha olefins or crosslinking comonomers such as 1,5-hexadiene, divinyl benzene, ethylidene, norbornene and the like can optionally be present in the above described copolymers. Such suitable copolymers are amorphous polymers having molecular weights from about 50,000 to about 100,000, preferably from about 50,000 to about 80,000. The high molecular weight copolymers suitable for use in this invention are readily prepared by contacting olefin mixtures containing from about 99 to about 75 weight percent of propylene and from about 1 to about 25 weight percent of ethylene with a metallic catalyst, e.g., a Ziegler or Phillips-type catalyst, dissolved in an inert liquid such as an aliphatic hydrocarbon. Generally such polymerizations are carried out in an inert atmosphere and at relatively low temperatures and pressures. It is understood that other known methods for producing ethylene/propylene copolymers having molecular weight in the specified range are also suitable. During the preparation of the high molecular weight copolymer, a certain amount of low molecular weight material, i.e., less than 50,000, is often produced. It is generally preferable to remove the low molecular weight copolymer by recrystallizing the higher molecular weight copolymer, i.e., greater than 50,000 and generally less than 100,000, from inert hydrocarbon solvents such as pentane. The resulting higher molecular weight ethylene/propylene copolymer is a random copolymer wherein the propylene and ethylene molecules are randomly dispersed throughout the polymer chain.

In addition to the above-described essential ingredients, optional ingredients such as mineral aggregates, cement, sand, asbestos, vermiculite, fiberglass and the like may also be included in the bituminous compositions of the present invention.

The bituminous material is suitably blended with the ethylene/propylene copolymer by any of several well known methods for blending asphalt materials with various rubbers and the like. For example, the ethylene/propylene copolymer can be placed on a hot-roll mill followed by the portionwise addition of the bituminous material until the desired dilution is obtained. In another technique, the copolymer is fluxed into a portion of the molten asphalt, and when a homogenous mixture is obtained, the balance of the asphalt is added.

The resulting blends of this invention contain from about 99 to about 50 weight percent of the bituminous material and from about 1 to about 50 weight percent of the ethylene/propylene copolymer, preferably from about 99 to about 75 weight percent and from about 1 to about 25 weight percent respectively.

The following examples are given to illustrate this invention and should not be construed as limiting its scope. In the specification and claims all parts and percentages are by weight unless otherwise indicated. In addition, all melt flow viscosities are determined according to ASTM D–1238–65 T(E).

EXAMPLE 1

A 50-part portion of an ethylene/propylene copolymer (40/60) having a melt flow viscosity of 0.7 decig/min. (MW = 51,000) is plastified on a hot-roll mill at 160° C. To the plastified copolymer is added 50 parts of a naphthenic type asphalt. Additional amounts of the asphalt are then blended with several samples of the resulting mixture at 100° C to produce blends having concentrations as specified in Table I. The various blends are melt-coated on aluminum panels (4 inches × 2 inches × 0.019 inch) and stored overnight at −18° C. The panels are then quickly flexed while cold. The degree of cracking and adhesion are given in Table I.

For the purposes of comparison, a control sample ($C_1$) of the naphthenic asphalt used above is similarly applied to an aluminum panel, stored overnight at −18° C and tested as described above. The results of the test are also shown in Table I.

TABLE I

| Sample No. | % of Ingredients Asphalt | Ethylene/Propylene Copolymer | Appearance After Flexing[1] |
|---|---|---|---|
| 1 | 75 | 25 | S |
| 2 | 80 | 20 | S |
| 3 | 85 | 15 | S |
| $C_1$* | 100 | 0 | I |

* Not an example of this invention
(1) S = no cracking, elastic and good adhesion after flexing at −18° C.
I = cracking, extensive splintering, brittle and poor adhesion upon flexing at −18° C.

EXAMPLE 2

An ethylene/propylene copolymer (40/60) having a melt flow viscosity of 0.2 decig/min. (MW = 65,000) is blended with various amounts of the asphalt of Example 1. The resultant blend samples are cast from hot melt at 200–240° C to form test tabs (2½ inches × ½ inch × ⅛ inch). The test tabs are placed on two supports spaced 1½ inches apart and tested for impact resistance at −18° C. The impact resistance testing device is basically a pivotal arm rotably mounted to a stationary member such that the point of impact occurs when the pivotal arm is on horizontal plane. The impact is increased merely by releasing the pivotal arm at a greater elevation from the point of impact. The results of the impact resistance tests are shown in Table II.

For the purposes of comparison and to particularly point out the advantages of this invention, an ethylene/propylene copolymer (52/48) having a melt flow viscosity of 52 decig/min. (MW = 24,000) is blended with various amounts of the asphalt used above. The resulting comparative samples ($D_1$, $D_2$, and $D_3$) are cast from hot melt at 200–240° C to form test tabs (2½ inches × ½ inch × ⅛ inch) which are tested for impact resistance by the method described above. The results are shown in Table II.

Also for the purposes of comparison a control sample ($C_2$) containing only the asphalt described above is tested for impact resistance and the results are likewise shown in Table II.

TABLE II

| Sample No. | % Ingredients[1] Asphalt | HMWC | LMWC | Impact Resistance, $10^4$ ergs[2] |
|---|---|---|---|---|
| 4 | 99 | 1 | 0 | 4.86 |
| 5 | 95 | 5 | 0 | 7.30 |
| 6 | 90 | 10 | 0 | 13.5 |
| $D_1$* | 99 | 0 | 1 | 3.34 |
| $D_2$* | 95 | 0 | 5 | 6.69 |
| $D_3$* | 90 | 0 | 10 | 6.99 |
| $C_2$* | 100 | 0 | 0 | 2.13 |

* Not an example of this invention
(1) HMWC = High molecular weight ethylene/propylene copolymer (65,000).
LMWC = Low molecular weight ethylene/propylene copolymer (24,000).
(2) Each value of impact resistance is given as the weighed average force required to break four test tabs.

EXAMPLE 3

In a manner similar to Example 2 samples (7 and 8), comparative samples ($D_4$ and $D_5$) and a control sample ($C_3$) are prepared using an aromatic asphalt instead of the naphthenic asphalt of Example 2. The same higher molecular weight ethylene/propylene copolymer used in the samples (4, 5 and 6) of Example 2 is used in samples (7 and 8). The same low molecular weight copolymer used in the comparative samples ($D_1$, $D_2$ and $D_3$) of Example 2 is used in the comparative samples ($D_4$ and $D_5$). The resulting blend samples and control sample are formed into test tabs and tested for impact strength by the procedure used in Example 2. The results of these tests are shown in Table III.

TABLE III

| Sample No. | % Ingredients[1] Asphalt | HMWC | LMWC | Impact Resistance $10^4$ ergs[2] |
|---|---|---|---|---|
| 7 | 99 | 1 | 0 | 1.98 |
| 8 | 90 | 10 | 0 | 7.60 |
| $D_4$* | 99 | 0 | 1 | 2.28 |
| $D_5$* | 90 | 0 | 10 | 1.37 |
| $C_3$* | 100 | 0 | 0 | 1.37 |

* Not an example of the invention
1–2 Same as in Table II.

As evidenced in Table III an increase in the high molecular weight ethylene/propylene copolymer concentration from 1 to 10 percent results in an increase in impact resistance. In contrast thereto, an increase in low molecular weight ethylene/propylene copolymer concentration from 1 to 10 percent results in a decrease in impact resistance.

EXAMPLE 4

A 50-part portion of the ethylene/propylene copolymer of Example 2 is plastified with a hot mill at 160° C. To the plastified copolymer is added a 50-part portion of the aromatic asphalt of Example 3. Additional amounts of the asphalt are then blended with several samples of the resulting mixture heated to 100° C to produce blend samples having concentrations as specified in Table IV. The blend samples (9, 10 and 11) are compression molded into test tabs (2½ inches × ½ inch × ⅛ inch) at temperatures less than 150° C and tested for impact strength by the procedure described in Example 2. The results of these tests are recorded in Table IV.

For the purposes of comparison, an ethylene/propylene copolymer (40/60) having a melt index of 60 decig/min. (MW = 23,000) is blended with various amounts of the asphalt described above. These resulting comparative blend samples ($D_6$, $D_7$ and $D_8$) are compression molded into test tabs by the above procedure. In a similar manner, other comparative blend samples ($D_9$, $D_{10}$ and $D_{11}$) are prepared using an ethylene/propylene copolymer (40/60) having a melt index of 6.3 decig/min. (MW = 33,400) and the above-described asphalt, molded into test tabs and tested for impact strength. Test tabs of a control sample ($C_4$) containing only the asphalt are similarly prepared and tested. The results of these tests are recorded in Table IV.

TABLE IV

| Sample No. | % of Ingredients[1] Asphalt | HMWC | LMWC (a) | LMWC (b) | Impact Resistance, $10^4$ ergs[2] |
|---|---|---|---|---|---|
| 9 | 99 | 1 | | | 0.84 |
| 10 | 95 | 5 | | | 2.31 |
| 11 | 90 | 10 | | | 7.60 |
| $D_6$* | 99 | | 1 | | 0.44 |

| | | | |
|---|---|---|---|
| D₇* | 95 | 5 | 1.66 |
| D₈* | 90 | 10 | 1.32 |
| D₉* | 99 | 1 | 0.33 |
| D₁₀* | 95 | 5 | 0.15 |
| D₁₁* | 90 | 10 | 3.28 |
| C₄* | 100 | | 0.84 |

\* Not an example of the invention
(1) HMWC = High molecular weight ethylene/propylene copolymer (MW = 65,000).
LMWC(a) = Low molecular weight ethylene/propylene copolymer (MW = 23,000).
LMWC(b) = Low molecular weight ethylene/propylene copolymer (MW = 33,400).
(2) Same as in Table II.

As evidenced in Table IV, blends of asphalt with ethylene/propylene copolymers having molecular weights greater than 50,000 exhibit substantially greater impact strengths than do blends of asphalt with ethylene/propylene copolymers having molecular weights below 40,000 at the same concentration of asphalt and copolymer. In the case of the blends of Table IV containing small amounts of the low molecular weight copolymer, the impact strength is even lower than that of the pure asphalt.

What is claimed is:

1. An asphalt composition having improved flexibility and impact strength over a wide range of temperatures which comprises (1) from about 99 to about 50 weight percent of an asphalt material and (2) from about 1 to about 50 weight percent of an ethylene/propylene copolymer having a molecular weight ranging from about 50,000 to about 100,000.

2. An asphalt composition according to claim 1 wherein the copolymer contains from about 10 to about 70 weight percent of polymerized ethylene and from about 90 to about 30 weight percent of polymerized propylene.

3. An asphalt composition according to claim 1 wherein the copolymer has a molecular weight ranging from about 50,000 to about 80,000.

4. An asphalt composition according to claim 1 wherein the composition contains from about 99 to about 75 weight percent of the asphalt material and from about 1 to about 25 weight percent of the copolymer.

5. A bituminous composition according to claim 4 wherein the copolymer contains from about 40 to about 50 weight percent of polymerized ethylene and from about 60 to about 50 weight percent of polymerized propylene.

6. A bituminous composition according to claim 1 wherein the bituminous material is asphalt.

* * * * *